United States Patent
Dieckmann et al.

(10) Patent No.: US 9,662,943 B2
(45) Date of Patent: May 30, 2017

(54) TIRE PRESSURE REGULATION AND AUTOMATIC REPAIR METHOD AND SYSTEM

(71) Applicant: WABCO GmbH, Hannover (DE)

(72) Inventors: Thomas Dieckmann, Pattensen (DE); Stephan Pertschy, Griesheim (DE); Frank Zielke, Barsinghausen (DE)

(73) Assignee: WABCO GMBH, Hannover (DE)

( * ) Notice: Subject to any disclaimer, the term of this patent is extended or adjusted under 35 U.S.C. 154(b) by 58 days.

(21) Appl. No.: 14/435,936

(22) PCT Filed: Oct. 2, 2013

(86) PCT No.: PCT/EP2013/002961
§ 371 (c)(1),
(2) Date: Apr. 15, 2015

(87) PCT Pub. No.: WO2014/082692
PCT Pub. Date: Jun. 5, 2014

(65) Prior Publication Data
US 2015/0283866 A1    Oct. 8, 2015

(30) Foreign Application Priority Data

Nov. 30, 2012    (DE) ......................... 10 2012 023 509

(51) Int. Cl.
*B60C 23/00* (2006.01)
*B29C 73/16* (2006.01)

(52) U.S. Cl.
CPC .......... *B60C 23/003* (2013.01); *B60C 23/002* (2013.01); *B29C 73/166* (2013.01)

(58) Field of Classification Search
None
See application file for complete search history.

(56) References Cited

U.S. PATENT DOCUMENTS

| 4,898,216 A | * | 2/1990 | Schultz ................ B60C 23/003 |
| | | | 141/197 |
| 5,180,456 A | | 1/1993 | Schultz et al. |
| 5,629,874 A | | 5/1997 | Mittal |
| 6,098,682 A | | 8/2000 | Kis |

(Continued)

FOREIGN PATENT DOCUMENTS

| DE | 30 01 056 A1 | 7/1981 |
| DE | 692 10 546 T2 | 6/1996 |

(Continued)

*Primary Examiner* — Redhwan k Mawari
*Assistant Examiner* — Edward Torchinsky
(74) *Attorney, Agent, or Firm* — Leydig, Voit & Mayer, Ltd.

(57) ABSTRACT

Setting or regulating a tire inflation pressure in one or more vehicle tires includes measuring and inflating in cycles. In each case, a seal is applied in at least one rotary transmitter. When the seal is applied, a tire filling pressure is changed and/or measured, and then the seal is removed again. The measuring and filling cycles can even be initiated while the vehicle is traveling. In intermediate time periods between the measuring or filling cycles, the seal is not applied. The measuring and filling cycles and the intermediate time periods are set as a function of ascertained current vehicle variables.

20 Claims, 2 Drawing Sheets

(56) References Cited

U.S. PATENT DOCUMENTS

| | | | | |
|---|---|---|---|---|
| 6,580,364 | B1 * | 6/2003 | Munch | B60C 23/0408 |
| | | | | 116/34 R |
| 7,111,507 | B2 * | 9/2006 | Fennel | B60C 23/0408 |
| | | | | 374/143 |
| 7,287,565 | B2 | 10/2007 | Hottebart et al. | |
| 2006/0190212 | A1 | 8/2006 | Kobetz | |
| 2009/0294005 | A1 | 12/2009 | Firestone | |

FOREIGN PATENT DOCUMENTS

| | | |
|---|---|---|
| DE | 101 30 035 A1 | 2/2002 |
| DE | 10 2005 004 955 A1 | 8/2006 |
| DE | 603 11 438 | 3/2007 |
| DE | 20 2011 051 292 U1 | 4/2012 |
| EP | 1 051 302 | 11/2000 |
| JP | 2009 056948 A | 3/2009 |
| WO | WO 03/074299 A1 | 9/2003 |

* cited by examiner

TIRE PRESSURE REGULATION AND AUTOMATIC REPAIR METHOD AND SYSTEM

FIELD OF THE INVENTION

The present invention generally relates to setting or regulating a tire inflation pressure in vehicle tires.

BACKGROUND OF THE INVENTION

EP 1051302B1 describes a tire inflation pressure-setting device and method of the general type under consideration. In agricultural vehicles, the tire inflation pressure can be checked and set by the vehicle itself. For this purpose, rotary signal transmitters, which permit compressed air transmission of the tire inflation pressure for the connected vehicle tire, are provided in the region of the wheel connections or rims. The tire inflation pressure can therefore be checked, and compressed air can be topped up or let out. The tire inflation pressure-setting device generally has a compressed air port for a compressed air supply, an electronic tire inflation pressure-control device and suitable valve devices, wherein compressed air is distributed from a compressed air supply via the valve devices to connecting lines to the rotary signal transmitters. Given a corresponding pneumatic actuation, the respective seal of the rotary signal transmitter can be applied, with the result that it seals when the vehicle tire is turning. Subsequently, in an inflation phase, compressed air can be topped up; and, subsequently, in a measuring phase, the current tire inflation pressure of the respective vehicle tire can be measured, for which purpose, for example, a central pressure sensor is provided.

The seal of the rotary signal transmitter is heavily loaded during travel, since the rotating vehicle tire has to be connected to the compressed air system, which is fixed to the vehicle. This loading of the seals generally limits their operational capability and service life.

SUMMARY OF THE INVENTION

Generally speaking, it is an object of the present invention to provide a system and a method for setting or regulating a tire inflation pressure in one or more vehicle tires, which permit reliable operation with low wear of the rotary signal transmitter seals.

In accordance with inventive embodiments, setting or regulating the tire filling pressure includes measuring and inflating in cycles. In each case, a seal can be applied in one or more rotary signal transmitters. When the seal is applied, a tire filling pressure can be changed and/or measured, and then the seal is decoupled again. In intermediate time periods between the cycles, the seal is not applied. The measuring and filling cycles and the intermediate time periods can be set as a function of ascertained current vehicle variables. The measuring and inflating cycles are therefore no longer defined statistically in advance, for example according to predefined times.

The current vehicle variables can comprise driving dynamics variables of the vehicle, such as the speed or the wheel rotational speeds, in particular the wheel rotational speed of the respective vehicle tire. The current vehicle variables can also comprise temperature values, in particular a brake temperature of the wheel brake, which is provided at the respective wheel of the vehicle tire, and furthermore an external temperature, in order to be able to determine cooling processes.

Loading of the seals of the rotary signal transmitters can be estimated from basically available or determinable current vehicle variables. This loading can be determined by:

the brake temperature, since the wheel brake is located in the direct vicinity of the rotary signal transmitter, and gives rise to considerable temperature increases. The wheel brakes are, as are the rotary signal transmitters, provided in the region of the wheel rims or wheel connections, with the result that a considerable flow of energy from the wheel brake to the rotary signal transmitter takes place. In this context it is recognized that the sealing material of the inserted seal of the rotary signal transmitter can be severely damaged at the high temperature loading.

the frictional power of the rotary signal transmitter, which, on the one hand, gives rise to temperature loading, and, on the other hand, to wear.

the speed and wheel rotational speeds, when the wheel rotational speed of the respective vehicle tire can be used to determine the frictional power of the rotary signal transmitter and also for the brake temperature of the wheel; the speed is relevant also for cooling processes.

the external temperature, in particular for cooling processes, and the time for the determination of durations; furthermore also the date and data relating to the distance lying ahead.

The temperature of the seals is relevant; high temperatures at the seals bring about failure of the sealing material and/or damage thereto. The temperature-induced loading can be calculated or estimated from a model using the energy supply by transporting heat from the wheel brake and the frictional power of the seals and cooling processes by means of the ram air as a function of the speed. In this context, both the measuring and inflating cycles and the intermediate time periods between them can be taken into account.

As a result, in a model for evaluating the current temperature of the seals of the rotary signal transmitters, heat-feeding-in processes can be taken into account by means of the measuring and inflating cycles themselves, that is, the frictional work of the seals and furthermore feeding in of heat by the respective wheel brake, as well as cooling processes by means of, for example, the conduction of heat in the wheel rim region, which, for example, can be estimated roughly in accordance with a model or else can be estimated from previous measurements or calibrations, and in particular cooling processes as a result of the ram air.

The brake temperature can be measured by a brake temperature sensor. As an alternative, the brake temperature can be determined from a model using the braking times, braking powers (as a function of the speed or reduction in the kinetic energy of the vehicle as a result of the braking) by taking into account cooling processes.

The relevant vehicle data can be made available via a vehicle-internal databus, in particular the CAN bus. Preferably, a tire inflation pressure-control device with an interface for the vehicle-internal databus is provided. As a result, in addition to the driving dynamic variables such as the speed and wheel rotational speeds, data relating to the time, date and external temperature can also be received. The brake temperature can, if appropriate, be received by an ABS control unit if the latter determines this value.

By evaluating the brake temperature, which can be measured or estimated by means of a simulation computation, measuring and inflating cycles can therefore be entirely suppressed in the case of hot seals in order to protect the seal. For this purpose, it is possible to define a maximum brake temperature for the brake temperature above which no measuring and inflating cycles are initiated. As an alternative, it is possible to provide that when the maximum brake temperature is exceeded, relatively long intermediate time periods are defined, and short measuring phases are defined in the measuring and inflating cycles.

Therefore, when travel starts with cold vehicle tires it is possible to set the pressure to, for example, 0.1 bar precisely (as a function of the external temperature), after which the tire inflation pressure is increased, which can be tolerated up to a maximum limit of, for example, +15%. Subsequently, in each case it is determined on an up-to-date basis when measuring and filling cycles are to be initiated. The temperature of the seals can then be estimated by means of a simulation calculation, and the application of the seals can be controlled as a function thereof. Furthermore, additional speed ranges can be defined.

According to an embodiment of the present invention, the wear of the seal can also be estimated for this purpose, activation cycles can be counted, or the wear can be simulated taking into account the application pressure and the wheel rotational speed, since, given a relatively high application pressure in the rotary signal transmitter, the wear is higher, and the wear on the seal is also larger in the case of an increasing wheel rotational speed. As a result, a certain minimum service life of the seals can be targeted.

Furthermore, it is possible to take into account that a vehicle tire can be repaired automatically again by sealing after its pressure has dropped, for example in the case of a leak. In this case, the system can be switched to an emergency inflation mode in which seals are applied for a relatively long time period. In this context, for example, relatively short measuring phases can be carried out in the measuring and inflating cycles in order to have available inflating phases that are as long as possible. The emergency inflating mode is advantageously activated only in the stationary state, i.e., at speed v=0.

According to a further embodiment, it is possible to provide that in the intermediate time periods between the measuring and inflating cycles, in addition to or as an alternative to the internal simulation in the tire inflation pressure-control device, monitoring is carried out by the brake control device, for example an ABS control device or EBS control device. The brake control device can infer a reduction in the tire inflation pressure from the comparison of the wheel rotational speeds of the vehicle wheels; such tire pressure monitoring systems using wheel rotational speeds are known. They can therefore be carried out, in particular, in the intermediate time periods, wherein when a drop in the tire inflation pressure is detected the tire inflation pressure-control device of the tire inflation pressure system can subsequently be activated in order to initiate the measuring and inflating cycle.

Alternatively or also additionally it is also possible to set the measuring and inflating cycles, and the intermediate time periods, as a function of the brake temperature instead of the determined seal temperature.

Furthermore, a regulating or setting process can also be carried out to the effect that minimization of the rotational-speed-dependent wear of the seals is targeted. In this context, wear of the individual seals can be estimated as a function of the wheel rotational speed; therefore, measuring and inflating cycles are carried out at times with low wheel rotational speeds and therefore a low speed.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The present invention is discussed in greater detail below with reference to the accompanying drawings, in which.

LIST OF REFERENCE SYMBOLS

Figure 1:
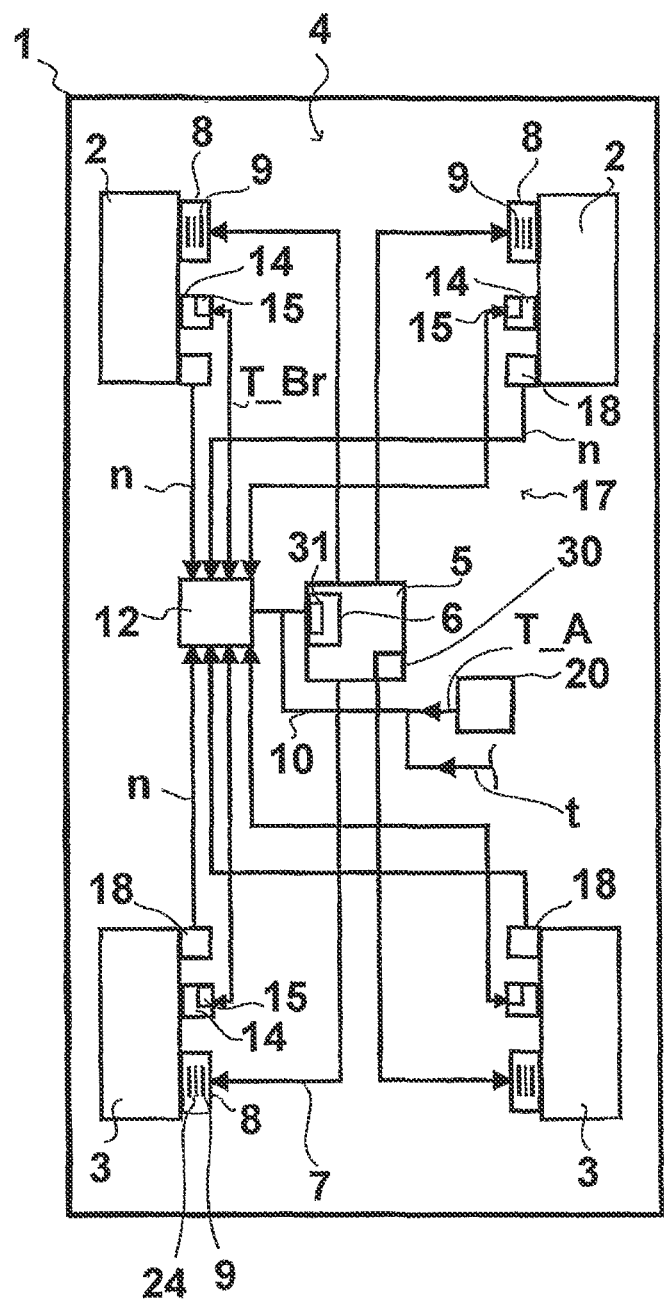
FIG. 1 is a circuit diagram showing a vehicle equipped with a tire inflation pressure-setting system according to an embodiment of the present invention.

1 Vehicle
2 Front tire
3 Rear tire
4 Tire inflation pressure-setting system
5 Central tire inflation pressure-modulation device
6 Tire inflation pressure-control device
7 Pneumatic connecting lines
8 Pneumatic devices
9 Rotary signal transmitter
10 CAN bus
12 Brake control device
14 Wheel brakes
15 Brake temperature sensors
17 Electropneumatic brake system
18 Rotational speed sensors (ABS sensors)
20 External temperature sensor
22 Measuring and inflating cycle
22a Inflating phase
22b Measuring phase
23 Intermediate time period
24 Seal
30 Pressure sensor
31 Interface
32 Compressed air supply
t Time signals
t1 Starting time
t2 End time
Δt3 Time interval
T_A External temperature
T_Br Brake temperature
Tg Brake temperature limiting value
v Speed
vg Vehicle limiting speed
n Wheel rotational speed signals
p Tire inflation pressure
px Maximum limit of the tire inflation pressure

DETAILED DESCRIPTION OF THE PREFERRED EMBODIMENTS

Figure 2:
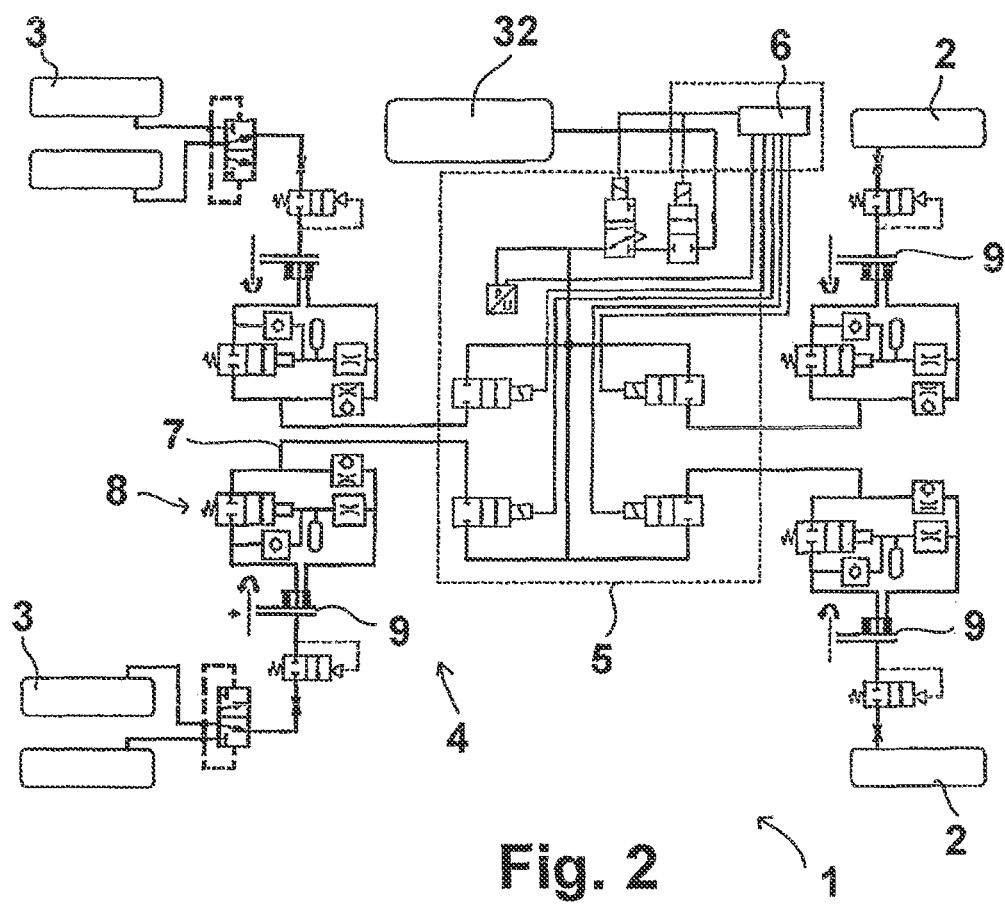
FIG. 2 is an electropneumatic circuit diagram of a tire inflation pressure-setting system in a vehicle with dual rear tires in accordance with an embodiment of the present invention.

Referring now to FIG. 1, a vehicle 1, in particular a utility vehicle, has vehicle tires 2, 3, specifically two front tires 2 and two rear tires 3. According to the embodiment shown in FIG. 2 the rear tires can, for example, also be dual rear tires.

The vehicle 1 has a tire inflation pressure-setting system 4 for setting the tire inflation pressure p in the vehicle tires 2, 3. The tire inflation pressure-setting system 4 generally has a central tire inflation pressure-modulation device (TPC modulation device) 5 with a tire inflation pressure-control device 6 (TPC control device) 6. Decentralized pneumatic devices 8 on the vehicle tires 2, 3 are connected via pneumatic connecting lines 7 to the central tire inflation pressure-modulation device 5. The tire inflation pressure-modulation device 5 is generally connected to a compressed air supply 32, shown by way of example in FIG. 2.

The pneumatic devices 8 have rotary signal transmitters 9, which permit inflation of the tires through the tire inflation pressure-modulation device 5 even during travel. For this purpose, a seal 24 of the respective rotary signal transmitter is applied pneumatically and brings about frictional contact with the respective vehicle tire 2 or 3 or the wheel. In the case of a two-channel design of the connecting lines 7, the rotary signal transmitters 9 can be actuated directly, that is, the pneumatic devices 8 are formed entirely or essentially by the rotary signal transmitters 9. In the case of single-channel actuation, pneumatic devices 8 generally have additional pneumatic circuits for actuating the rotary signal transmitters 9. The connecting lines 7 permit a bidirectional compressed air line in order to measure the tire inflation pressure p in the vehicle tires 2, 3 by means of a pressure sensor 30, which is provided in the tire inflation pressure-modulation device 5.

The rotary signal transmitters 9 are actuated pneumatically by means of the respective connecting line 7, with the result that, at a starting time t1, the respective seal 24 is applied and therefore a compressed air connection is formed between the vehicle tire 2 or 3 and the respective pneumatic connecting line 7, and therefore the tire inflation pressure-modulation device 5, as a result of which a measuring and inflating cycle 22 is started, which, for example, first comprises an inflating phase 22a and subsequently a measuring phase 22b, after which, at an end time t2, the seal 24 is opened again.

The tire inflation pressure-control device 6 has an interface 31 at a vehicle-internal CAN bus 10 via which it is connected to further control devices of the vehicle 1, in particular a brake control device 12, which can be, for example, an ABS and/or EBS control device and advantageously controls an electro-pneumatic brake system 17. The brake system 17 has wheel brakes 14, which have, if appropriate, brake temperature sensors 15, which output measuring signals of the brake temperature T_Br to the brake control device 12. The measuring signals of the brake temperature T_Br of the individual wheel brakes 14 are passed onto the tire inflation pressure-control device 6 via, for example, CAN bus 10.

The brake system 17 has, at the individual wheels of the front and rear tires 2, 3, rotational speed sensors (ABS sensors) 18, which output corresponding wheel rotational speed signals n to the brake control device 12. The wheel rotational speed signals n of the individual front and rear tires 2, 3 are also correspondingly transmitted via the CAN bus 10 to the tire inflation pressure-control device 6. Furthermore, the tire inflation pressure-control device 6 receives, via the CAN bus 10, signals relating to the external temperature T_A, which, can, for example, individually measure values of an external temperature sensor 20 of the vehicle 1, and a speed signal v. The tire inflation pressure-control device 6 also has an internal clock or receives the corresponding time signals t with indications about the time and date via the CAN bus 10.

Figure 3:
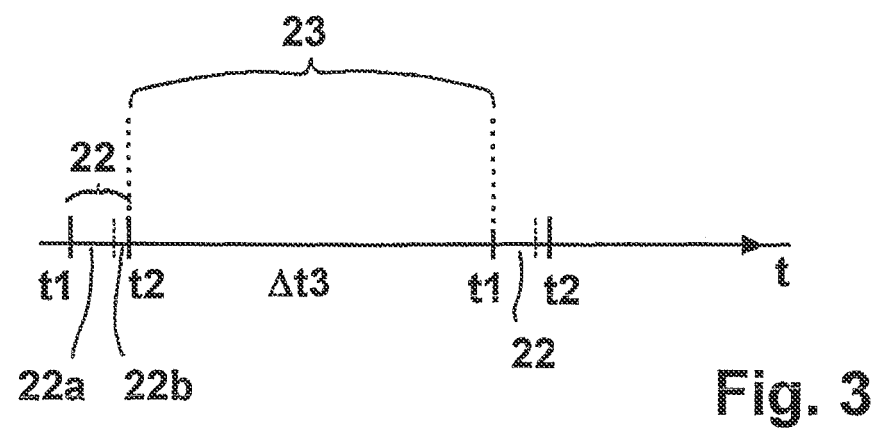
FIG. 3 is a timing diagram illustrating a sequence of measuring and inflating cycles according to an embodiment of the present invention.

The tire inflation pressure-control device 6 therefore determines the starting times t1 for initiating the measuring and inflating cycles 22 and the end times t2 for ending the measuring and inflating cycles 22, from these signals or measurement values, that is, the wheel speeds n, the time signals t, the signals relating to the external temperature T_A, the speed v and advantageously—if present—the measurement signals of the brake temperature T_Br of the individual vehicle tires, i.e., the front tires 2 and rear tires 3. FIG. 3 shows the time profile as a time arrow. The time interval Δt3 between the measuring and inflating cycles and the time length t2−t1 of the measuring and inflating cycles 22 is determined by the tire inflation pressure-control device 6.

In this context, the tire inflation pressure-control device 6 or a simulation or computing device connected thereto carries out a simulation calculation for estimating the brake temperature T_Br of the individual wheel brakes 14. The objective is to suppress entirely or largely measuring and inflating cycles 22 in the case of hot wheel brakes 14. As a result, for example, the determined brake temperature T_Br can be compared with an (upper) brake temperature limiting value Tg, with the result that, in the case of T_Br>Tg, no measuring and inflating cycle 22 is initiated, in order to protect the seals 24 of the rotary signal transmitters 9, or the number and frequency of the measuring and inflating cycles 22 is reduced. Furthermore, the measuring phase 22b can be reduced.

At the start of travel, on the one hand the brake temperature T_Br and also the cooling of the wheel brakes 14 after activation can be estimated by means of the determined external temperature T_A, additionally, for example, by means of the time signal t. As a result, the state of the vehicle tires at the start of travel, that is, the cold tire temperature, can be determined or estimated. For example, in a first measuring and inflating cycle 22, the tire inflation pressure p can therefore be set to 0.1 bar precisely, also independently of the external temperature T_A. After the start of travel, the tire inflation pressure p increases, which is tolerated, for example, up to a maximum limit of px=1.15, that is, an increase of 15 percent.

Measuring and inflating cycles 22 can basically be initially set periodically, for example according to time or also according to kilometers traveled. In this context, this classification according to measuring and inflating cycles 22 and intermediate time periods 23 is initially aimed at by the tire inflation pressure-control device 6; by measuring the brake temperature T_Br it is determined in this way whether the brake temperature limiting value Tg is, under certain circumstance, exceeded, with the result that in this case a measuring and inflating cycle 22 is not initiated but rather postponed.

Furthermore, the measuring and inflating cycles 22 can be set already from the onset, or else as a function of ambient conditions, to specific speed ranges, for example v<vg, with vg as the vehicle limiting speed or wheel rotational speed limiting values, since at relatively high wheel rotational speeds n the loading on the seals is correspondingly greater. In this context, it is possible to provide, for example, that when the brake temperature limiting value Tg is exceeded and/or the vehicle limiting speed vg is exceeded, a measuring and inflating cycle 22 is initiated in each case after relatively long time periods for safety reasons—despite the high brake temperature T_Br or high speed v—wherein these time periods are then set, for example, to be significantly longer than the time interval Δt3 of the normal intermediate time periods 23.

When the sealing is applied during travel, that is, v>0, the seals 24 of the rotary signal transmitters 9 are heated by the frictional power, and are furthermore subjected to direct frictional wear. The temperature can be estimated by a simulation calculation of the tire inflation pressure-control device 6, with the result that the times for the application of the seals 24 in the measuring and inflating cycles 22 can be controlled in this way.

Furthermore, braking processes also bring about an increase in the temperature of the seals 24, since the wheel brakes 14 are mounted in the wheel connecting region or region of the rims, and therefore in the direct vicinity of the rotary signal transmitters 9; there is direct conduction of heat to the seals 24.

As a result in this context, further designs or embodiments are possible. For example, the measuring and inflating cycles 22 can be counted and used to simulate the wear of the seals 24 under different conditions. The measuring cycle frequency, that is, the number of measuring and inflating cycles 22 or the proportion of the time length t2–t1 of the total time, can be set, with the result that a specific minimum service life of the seals 24 is achieved.

If it is determined that the tire inflation pressure p in a front tire 2 or rear tire 3 has dropped severely, for example after a leak, which can be repaired again by a sealant, the system can be switched to an emergency inflating mode. In this emergency inflating mode, the seals are applied for a longer time period than the time length t2–t1 in order to bring about re-inflation. Correspondingly, the measuring phases 22b in the measuring and inflating cycles 22 are set correspondingly lower, in order to be able to fill in as much air again in the shortest possible time. This mode can advantageously be activated only in the stationary state, that is, when v=0.

If the brake control device 12 has tire inflation pressure monitoring by evaluation of the wheel rotational speeds n, which monitoring compares the wheel rotational speeds n of an axle, i.e., of the two front wheels 2 or of the two rear wheels 3 and detects a relatively low tire inflation pressure p from wheel rotational speeds n, which are relatively high, over the medium term or long term, since the radius of the wheel of the respective vehicle tire 2 or 3 is smaller, an interface can be provided between the functions of the brake control device 12 and the tire inflation pressure-control device 6. The latter can be configured such that the brake control device 12 performs the monitoring of the respective vehicle tires 2, 3 in the intermediate time periods 23, in which measurement does not take place, and an estimation of the tire inflation pressure p, which has not been determined, is enabled by comparing the wheel rotational speeds n. In brief measuring and inflating cycles 22 it is possible to perform recalibration in each case, that is, to carry out adjustment to the actual measured values.

It is possible, for example, to stipulate a vehicle limiting speed vg of 60 km/h for normal driving mode, with the result that measuring and inflating cycles 22 are carried out only at speeds v<vg=60 km/h. However, if v>vg is present over a relatively long time period, it is also possible, for example, for a certain number of measuring and inflating cycles to be permitted up to, for example, an upper vehicle limiting speed vg2=90 km/h if the measured or determined brake temperature T_Br and external temperature T_A do not exceed a defined threshold. If, on the other hand, a sufficiently frequent change in the speed level is detected, inflating and measuring cycles 22 are carried out only below vg=60 km/h.

Furthermore, the inflating and measuring cycles 22 can be counted according to the number or even total duration for use in simulating the wear of the seal under various conditions. It is possible, for example, to control the measuring cycle frequency predicatively, with the result that a specific minimum service life of the seals 24 is reached. For example, a maximum seal application duration per 1000 km can be predefined on the basis of a service life, which is measured in test bench trials and the aimed-at total distance to be traveled by the vehicle. Depending on the driving profile and ambient conditions, a varying cycle frequency can therefore be achieved over the service life.

Furthermore, an emergency inflation mode can be provided in which, when a leak is detected that can be automatically repaired again by a sealant, the system is switched to an "emergency inflation mode". In this emergency inflation mode, the seals are applied over a relatively long time period, wherein this mode can advantageously be set only in the stationary state when v=0. In such an emergency mode, as described above, only a few measuring phases 22b in the measuring and inflating cycles 22 can be effected, in order to be able to use as much time as possible for feeding in air again.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A method for regulating tire pressure in at least one tire of a vehicle, the method comprising:
    effecting, as a function of current vehicle variables, that include at least one of current driving dynamics variables, vehicle speed, and wheel rotational speeds, tire pressure measuring and inflating cycles in which at least one seal is applied in at least one rotary signal transmitter, the tire inflation pressure is one of measured and changed, and the at least one seal is subsequently decoupled;
    effecting, as a function of the current variables of the vehicle, intermediate time periods between the measuring and inflating cycles in which the at least one seal is not applied;
    effecting at least one of fewer and shorter measuring and inflating cycles when at least one of the vehicle speed and the wheel rotational speeds increase;
    effecting, when the vehicle is traveling above a vehicle limiting speed, at least one of:
        (i) no measuring and inflating cycles,
        (ii) measuring and inflating cycles having a shorter duration than below the vehicle limiting speed,
        (iii) a lower frequency of measuring and inflating cycles, and
        (iv) longer intermediate time periods between the measuring and inflating cycles;
    evaluating driving behavior of the vehicle during a preceding time period; and effecting, when a frequently varying speed level is identified, a lower vehicle limiting speed than when a relatively uniform speed level is identified.

2. The method as claimed in claim 1, wherein the current vehicle variables further include at least one current brake temperature of a wheel brake of the at least one tire.

3. The method as claimed in claim 2, wherein the measuring and inflating cycles of the at least one tire at least one of occur at a frequency that is below a threshold frequency and have a duration that is below a threshold duration.

4. The method as claimed in claim 2, further comprising determining the current brake temperature from at least one of a measurement and a model using a determined frictional power of the wheel brake, an external temperature of the vehicle and a cooling power as a function of vehicle speed.

5. The method as claimed in claim 2, further comprising effecting, as brake temperature rises, at least one of (i) no measuring and inflating cycles, (ii) fewer of the measuring and inflating cycles, (iii) measuring and inflating cycles of shorter duration, (iv) a lower frequency of the measuring and inflating cycles, and (v) longer intermediate time periods between the measuring and inflating cycles.

6. The method as claimed in claim 5, further comprising determining a frictional power of the wheel brake based on previous ones of the measuring and inflating cycles using at least one of vehicle speeds and wheel rotational speeds during the previous ones of the measuring and inflating cycles.

7. The method as claimed in claim 1, further comprising determining a frictional power of the at least one seal of the at least one rotary signal transmitter during the measuring and inflating cycles from a model using rotational speed of the at least one vehicle tire and duration of the measuring and inflating cycles and the intermediate time periods.

8. The method as claimed in claim 1, further comprising obtaining a driving profile of one of a distance covered and a previously issued distance determined on the basis of at least one of map data and navigation data; and
setting the measuring and inflating cycles at times with at least one of a vehicle speed that is below a threshold and a braking power that is below a threshold.

9. The method as claimed in claim 1, further comprising identifying a leak in the at least one tire when a reduction in the tire inflation pressure by a limiting value is detected in the at least one vehicle tire;
initiating automatic repair of the leak by supplying a sealant via the at least one rotary signal transmitter; and
setting, in a stationary state of the vehicle, an emergency inflating mode in which the measuring and inflating cycles are longer with shorter measuring phases.

10. The method as claimed in claim 1, further comprising monitoring the tire inflation pressure in the intermediate time periods by a brake control device;
comparing wheel rotational speed signals of the at least one vehicle tire;
determining from the comparing whether a tire inflation reduction in the tire inflation pressure is present at the at least one vehicle tire; and
activating a tire inflation pressure control device when the tire inflation pressure reduction is identified.

11. The method as claimed in claim 1, wherein effecting the tire pressure measuring and inflating cycles and the intermediate time periods is a function of at least one of (i) wear of the at least one seal caused by brake temperature and (ii) minimization of rotational-speed-dependent wear of the at least one seal.

12. A tire inflation pressure-setting system for a vehicle, the system comprising:
a tire inflation pressure-modulation device connected to a compressed air supply; a tire inflation pressure-control device;
at least one pneumatic device on at least one tire of the vehicle, the at least one pneumatic device having at least one rotary signal transmitter; and
pneumatic connecting lines running from the tire inflation pressure-modulation device to the at least one pneumatic device;
wherein, during travel of the vehicle, as a function of vehicle variables that include at least one of current driving dynamics variables, vehicle speed, and wheel rotational speeds, the tire inflation pressure-control device is configured to:
set measuring and inflating cycles, in which at least one seal of the at least one rotary signal transmitter is applied to the at least one vehicle tire for subsequent pneumatic connection of the tire inflation pressure-modulation device to the at least one vehicle tire with the formation of rotational friction at the at least one seal,
set intermediate time periods between the measuring and inflating cycles,
effect at least one of fewer and shorter measuring and inflating cycles when at least one of the vehicle speed and the wheel rotational speeds increase;
effect, when the vehicle is traveling above a vehicle limiting speed, at least one of:
(i) no measuring and inflating cycles,
(ii) measuring and inflating cycles having a shorter duration than below the vehicle limiting speed,
(iii) a lower frequency of measuring and inflating cycles, and
(iv) longer intermediate time periods between the measuring and inflating cycles,
evaluate driving behavior of the vehicle during a preceding time period; and
effect, when a frequently varying speed level is identified, a lower vehicle limiting speed than when a relatively uniform speed level is identified.

13. The tire inflation pressure-setting system as claimed in claim 12, wherein the tire inflation pressure-control device has an interface with a vehicle-internal databus to receive at least some of the vehicle variables.

14. A method for regulating tire pressure in at least one tire of a vehicle, the method comprising:
effecting, as a function of current variables of the vehicle, tire pressure measuring and inflating cycles in which at least one seal is applied in at least one rotary signal transmitter, the tire inflation pressure is one of measured and changed, and the at least one seal is subsequently decoupled; and
effecting, as a function of the current variables of the vehicle, intermediate time periods between the measuring and inflating cycles in which the at least one seal is not applied,
wherein effecting the tire pressure measuring and inflating cycles and the intermediate time periods is a function of at least one of (i) wear of the at least one seal caused by brake temperature and (ii) minimization of rotational-speed-dependent wear of the at least one seal.

15. The method of claim 14, further comprising determining a frictional power of the at least one seal of the at least one rotary signal transmitter during the measuring and inflating cycles from a model using rotational speed of the at least one vehicle tire and duration of the measuring and inflating cycles and the intermediate time periods.

16. The method of claim 14, further comprising obtaining a driving profile of one of a distance covered and a previously issued distance determined on the basis of at least one of map data and navigation data; and setting the measuring and inflating cycles at times with at least one of a relatively low vehicle speed and relatively low braking power.

17. The method of claim 14, further comprising identifying a leak in the at least one tire when a reduction in the tire inflation pressure by a limiting value is detected in the at least one vehicle tire;

initiating automatic repair of the leak by supplying a sealant via the at least one rotary signal transmitter; and setting, in a stationary state of the vehicle, an emergency inflating mode in which the measuring and inflating cycles are longer with shorter measuring phases.

18. The method of claim 14, further comprising monitoring the tire inflation pressure in the intermediate time periods by a brake control device;

comparing wheel rotational speed signals of the at least one vehicle tire;

determining from the comparing whether a tire inflation reduction in the tire inflation pressure is present at the at least one vehicle tire; and activating a tire inflation pressure control device when the tire inflation pressure reduction is identified.

19. The method of claim 14, wherein the current variables of the vehicle include current driving dynamics variables.

20. The method of claim 14, wherein the current variables of the vehicle include at least one of vehicle speed and wheel rotational speeds.

* * * * *